(12) United States Patent
Shen et al.

(10) Patent No.: US 12,347,061 B2
(45) Date of Patent: Jul. 1, 2025

(54) SPLITTING AND SCALING IMAGES FOR INPUT TO A MODEL AND METHOD, MEDIUM, AND DEVICE THEREFOR

(71) Applicant: Horizon (Shanghai) Artificial Intelligence Technology Co., Ltd., Shanghai (CN)

(72) Inventors: Junzhi Shen, Shanghai (CN); Zhenjiang Wang, Shanghai (CN); Jianjun Li, Shanghai (CN)

(73) Assignee: Horizon (Shanghai) Artificial Intelligence Technology Co., Ltd., Shanghai (CN)

( * ) Notice: Subject to any disclaimer, the term of this patent is extended or adjusted under 35 U.S.C. 154(b) by 590 days.

(21) Appl. No.: 17/764,409

(22) PCT Filed: Nov. 24, 2020

(86) PCT No.: PCT/CN2020/131057
§ 371 (c)(1),
(2) Date: Mar. 28, 2022

(87) PCT Pub. No.: WO2022/021695
PCT Pub. Date: Feb. 3, 2022

(65) Prior Publication Data
US 2022/0351329 A1 Nov. 3, 2022

(30) Foreign Application Priority Data
Jul. 31, 2020 (CN) .......................... 202010765242.5

(51) Int. Cl.
*G06T 3/40* (2024.01)
(52) U.S. Cl.
CPC ...................... *G06T 3/40* (2013.01)
(58) Field of Classification Search
CPC ....... G06T 3/40; G06T 3/4007; G06T 3/4038; G06T 3/4046; G06T 3/4056–4076;
(Continued)

(56) References Cited

U.S. PATENT DOCUMENTS 9,060,171 B2   6/2015 Tang
2014/0341430 A1* 11/2014 Ryu .......................... G06T 3/40
                                                          382/103
(Continued)

FOREIGN PATENT DOCUMENTS

CN    107801026 A    3/2018
CN    108537729 A    9/2018
(Continued)

OTHER PUBLICATIONS

Ghosh, Swarnendu, Nibaran Das, and Mita Nasipuri. "Reshaping inputs for convolutional neural network: Some common and uncommon methods." Pattern Recognition 93 (2019): 79-94. (Year: 2019).*
Office Action for corresponding Japan Patent Application No. 2022-520212 mailed on May 9, 2023, and its English translation, 4 pages.
First Office Action and Search Report for corresponding Chinese Patent Application No. 202010765242.5 mailed on Jul. 17, 2023, and its English translation, 15 pages.
(Continued)

*Primary Examiner* — Geoffrey E Summers
(74) *Attorney, Agent, or Firm* — K&L Gates LLP

(57) ABSTRACT

Embodiments of the present disclosure disclose an image processing method, method for generating instructions for image processing, and apparatuses therefor. The method includes: if an ROI image is obtained, splitting to obtain a plurality of image blocks based on a first image size supported by an image processing model, first split data, and the obtained ROI image, wherein each image size obtained by splitting the first image size based on the first split data matches a hardware output size of an image scaling module; performing image scaling on each image block to obtain scaled image blocks, wherein each image size of the scaled image blocks is consistent with a respective image size; and inputting all scaled image blocks to the image processing
(Continued)

model sequentially. In the embodiments, although output of image scaling module is limited, subsequent processes involved in the visual image processing technology may be properly executed.

20 Claims, 9 Drawing Sheets

(58) Field of Classification Search
CPC . G06T 2207/20081; G06T 2207/20084; G06T 2207/20021; G06V 10/22–235; G06V 10/25; G06V 10/454; G06V 10/82; G06N 3/02–0985
See application file for complete search history.

(56) References Cited

U.S. PATENT DOCUMENTS

| | | | |
|---|---|---|---|
| 2016/0217319 | A1 | 7/2016 | Bhanu et al. |
| 2022/0028088 | A1* | 1/2022 | Bui .................. G06T 7/174 |

FOREIGN PATENT DOCUMENTS

| | | |
|---|---|---|
| CN | 110232657 A | 9/2019 |
| CN | 111860694 A | 10/2020 |
| JP | 2014-131262 A | 7/2014 |

OTHER PUBLICATIONS

Second Chinese Office Action from corresponding Chinese Patent Application No. 202010765242.5, mailed on Jan. 4, 2024, and its English translation, 13 pages.

Third Chinese Office Action from corresponding Chinese Patent Application No. 202010765242.5, mailed on Jun. 21, 2024, and its English translation, 14 pages.

Extended European Search Report from corresponding European patent application No. 20947620.9, mailed on Aug. 4, 2023, 9 pages.

Aho et al., Block-Level Parallel Processing for Scaling Evenly Divisible Frames, IEEE, 2005, p. 1134-1137.

Frucci et al., An Automatic Image Scaling Up Algorithm, MCPR 2012, LNCS 7329, p. 35-44.

Raghupathy et al., Algorithm and VLSI Architecture for High Performance Adaptive Video Scaling, IEEE Transactions on Multimedia, Dec. 2003, vol. 5, No. 4, p. 489-502.

Kim et al., Winscale: An Image-Scaling Algorithm Using an Area Pixel Model, IEEE Transactions on Circuits and Systems for Video Technology, Jun. 2003, vol. 13, No. 6, p. 549-553.

Chinese Rejection Decision from the corresponding Chinese Patent Application No. 202010765242.5, mailed on Sep. 5, 2024 and its English translation.

* cited by examiner

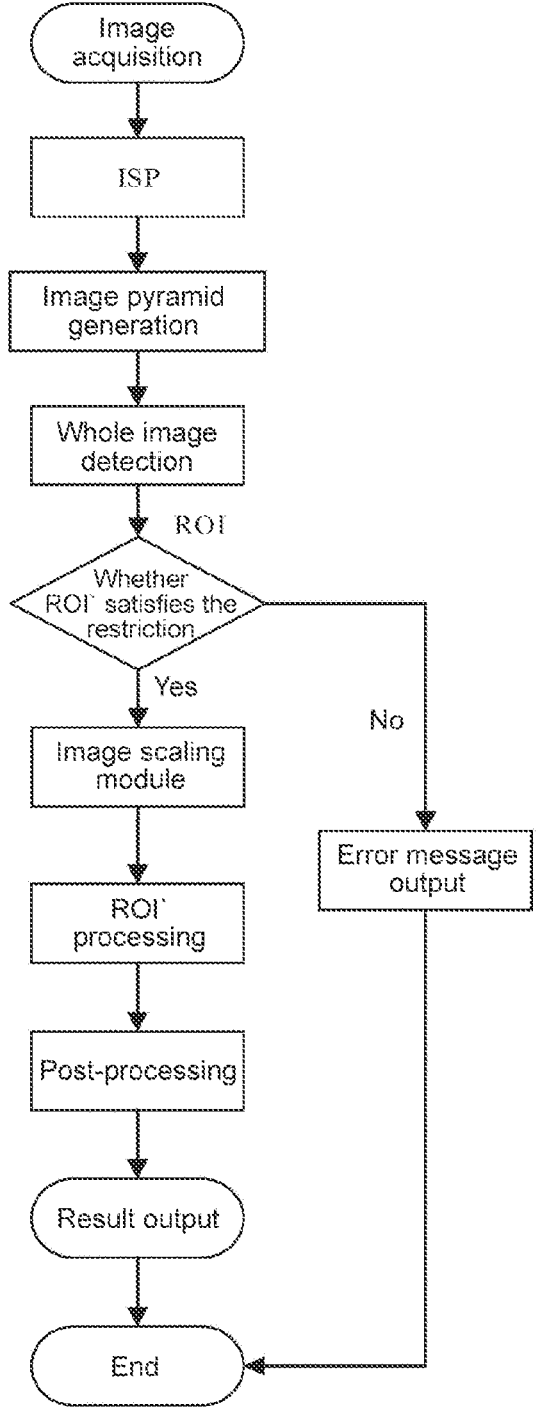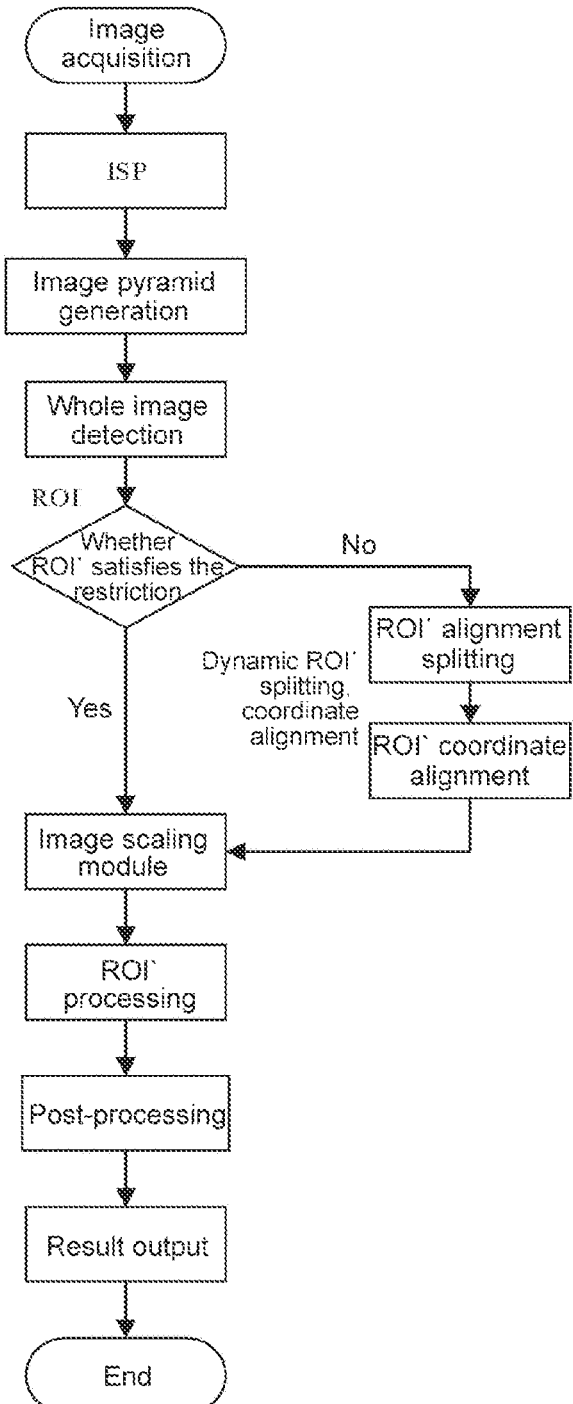
FIG. 5A
FIG. 5B

SPLITTING AND SCALING IMAGES FOR INPUT TO A MODEL AND METHOD, MEDIUM, AND DEVICE THEREFOR

The present disclosure claims the priority to the Chinese patent application No. CN 202010765242.5, filed with the Chinese Patent Office on Jul. 31, 2020 and entitled "IMAGE PROCESSING METHOD, METHOD FOR GENERATING INSTRUCTIONS FOR IMAGE PROCESSING AND APPARATUSES THEREFOR", which is incorporated herein by reference in its entirety.

FIELD OF THE INVENTION

The present disclosure relates to the technical field of image processing, and in particular, to an image processing method, and a method for generating instructions for image processing and apparatuses therefor.

BACKGROUND OF THE INVENTION

When using the visual image processing technology, after whole image detection is completed, a region of interest (ROI) image for a particular task may be generated. Subsequently, the ROI image may be scaled by an image scaling module, and the scaled image may be input into an image processing model for processing. In many cases, due to the output limitation of the image scaling module, the image scaling module does not perform scaling processing on part of the ROI image, but merely outputs an error prompt. In this case, the subsequent processes involved in the visual image processing technology cannot be executed normally.

SUMMARY OF THE INVENTION

To resolve the foregoing technical problem, the present disclosure is proposed. Embodiments of the present disclosure disclose an image processing method, and a method for generating instructions for image processing and apparatuses therefor.

According to an aspect of an embodiment of the present disclosure, an image processing method is provided, the method including:
when a region of interest (ROI) image is obtained, determining and splitting a to-be-split ROI image to obtain a plurality of image blocks based on a first image size supported by an image processing model, first split data, and the obtained ROI image, where each of a plurality of image sizes obtained by splitting the first image size based on the first split data matches with a hardware output size of an image scaling module;
performing image scaling on each of the plurality of image blocks respectively, to obtain a plurality of scaled image blocks, wherein a plurality of image sizes of the plurality of scaled image blocks are consistent in one-to-one correspondence with the plurality of image sizes obtained by splitting the first image size based on the first split data; and
inputting the plurality of scaled image blocks into the image processing model, sequentially.

According to another aspect of an embodiment of the present disclosure, a method for generating instructions for image processing is provided, the method including:
when a hardware output size of an image scaling module does not match with a first image size supported by an image processing model, determining information about a splitting manner for a template image having the first image size based on the hardware output size and the first image size, wherein the information about the splitting manner is used for splitting the template image into a plurality of image blocks, and an image size of each of the plurality of image blocks matches with the hardware output size;
obtaining first split data based on the information about the splitting manner; and
generating instructions for image processing based on the first split data, wherein the instructions for image processing are used for implementing the foregoing image processing method.

According to yet another aspect of an embodiment of the present disclosure, an image processing apparatus is provided, the apparatus including:
a splitting module, configured to determine split and a to-be-split region of interest (ROI) image to obtain a plurality of image blocks, when an ROI image is obtained, based on a first image size supported by an image processing model, first split data, and the obtained ROI image, where each of a plurality of image sizes obtained by splitting the first image size based on the first split data matches with a hardware output size of an image scaling module;
an image scaling module, configured to perform image scaling on each of the plurality of image blocks that are obtained by the splitting module respectively, to obtain a plurality of scaled image blocks, where a plurality of image sizes of the plurality of scaled image blocks are consistent in one-to-one correspondence with the plurality of image sizes obtained by splitting the first image size based on the first split data; and
an input module, configured to input the plurality of scaled image blocks obtained by the image scaling module into the image processing model, sequentially.

According to still another aspect of an embodiment of the present disclosure, an apparatus for generating instructions for image processing is provided, the apparatus including:
a determining module, configured to determine, when a hardware output size of an image scaling module does not match with a first image size supported by an image processing model, information about a splitting manner for a template image having the first image size based on the hardware output size and the first image size, where the information about the splitting manner is used for splitting the template image into a plurality of image blocks, and an image size of each of the plurality of image blocks matches with the hardware output size;
an obtaining module, configured to obtain first split data based on the information about the splitting manner determined by the determining module; and
a generation module, configured to generate instructions for image processing based on the first split data obtained by the obtaining module, where the instructions for image processing are used for implementing the foregoing image processing method.

According to still another aspect of an embodiment of the present disclosure, a computer readable storage medium is provided, where the storage medium stores a computer program, the computer program being used for implementing the foregoing image processing method or for implementing the foregoing method for generating instructions for image processing.

According to still another aspect of an embodiment of the present disclosure, an electronic device is provided, where the electronic device includes:

a processor; and a memory, configured to store processor-executable instructions, wherein the processor is configured to read the processor-executable instructions from the memory and execute the instructions to implement the foregoing image processing method, or to implement the foregoing method for generating instructions for image processing.

According to the image processing method and apparatus, the method and apparatus for generating instructions for image processing, the computer readable storage medium, and the electronic device that are provided in the embodiments of the present disclosure, when the ROI image is obtained, a plurality of image blocks may be obtained through splitting based on the first image size supported by the image processing model, the first split data, and the obtained ROI image. Subsequently, image scaling may be performed on each of the plurality of image blocks respectively, to obtain a plurality of scaled image blocks. Because the plurality of image sizes of the plurality of scaled image blocks are consistent in one-to-one correspondence with the plurality of image sizes obtained by splitting the first image size based on the first split data, the image size of each of the plurality of scaled image blocks matches with the hardware output size, and all scaled image blocks can be normally output from the image scaling module. And then the plurality of scaled image blocks are sequentially and normally input into the image processing model. As such, in the embodiments of the present disclosure, although output of the image scaling module is limited, by using the first split data and further in combination with an image splitting operation and an image scaling operation, a plurality of scaled image blocks can be normally output from the image scaling module, and the plurality of scaled image blocks can be provided to the image processing model for normal processing, so as to ensure normal execution of the subsequent processes involved in the visual image processing technology.

The technical solutions of the present disclosure are further described in detail below with reference to the accompanying drawings and embodiments.

BRIEF DESCRIPTION OF THE DRAWINGS

By describing the embodiments of the present disclosure more detailed with reference to the accompanying drawings, the foregoing and other objectives, features, and advantages of the present disclosure will become more apparent. The accompanying drawings are used to provide further understanding of the embodiments of the present disclosure, constitute a part of the specification, are used to explain the present disclosure together with the embodiments of the present disclosure, and do not constitute limitation to the present disclosure. In the accompanying drawings, the same reference numerals generally represent the same components or steps.

FIG. 5A is a workflow diagram of a system for realizing the visual image processing technology according to the prior art.

FIG. 5B is a workflow diagram of a system for realizing the visual image processing technology according to an embodiment of the present disclosure.

DETAILED DESCRIPTION OF THE EMBODIMENTS

Figure 1:
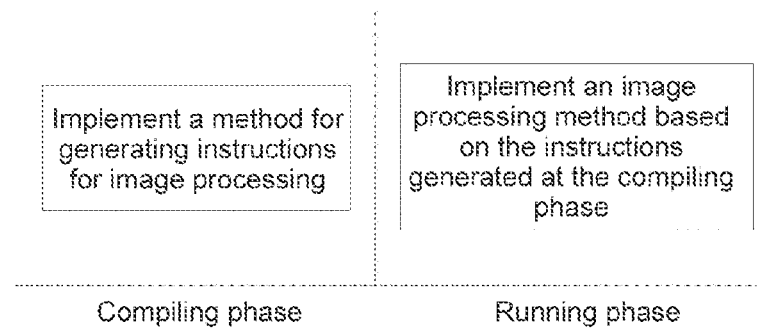
FIG. 1 is an overall schematic diagram of an embodiment of the present disclosure.

In the following, exemplary embodiments according to the present disclosure are described in detail with reference to the accompanying drawings. Obviously, the described embodiments are only some of the embodiments of the present disclosure, but not all of them. It should be understood that the present disclosure is not limited by the exemplary embodiments described herein.

It should be noted that unless otherwise specified, the scope of the present disclosure is not limited by the relative arrangement of the components and steps, numeric expressions, and numerical values described in these embodiments.

A person skilled in the art may understand that terms such as "first" and "second" in the embodiments of the present disclosure are merely used to distinguish between different steps, devices, or modules, etc., and neither represent any particular technical meaning, nor indicate necessarily logical ordering among them. "A plurality of" refers to two or more, and "at least one" refers to one, two, or more.

It should be further understood that, any component, data, or structure involved in the embodiments of the present disclosure may be generally construed to one or more, unless clearly stated or the context indicates otherwise.

In addition, the term "and/or" in the present disclosure is only description of the association relationship of the associated objects, indicating presence of three kinds of relationship. For example, A and/or B may indicate presence of A alone, both A and B, or B alone. The character "/" in the present disclosure generally indicates an "or" relationship of the associated objects.

It should be further understood that, the descriptions of the various embodiments of the present disclosure focus on differences among the various embodiments. The same or similar parts in the embodiments may refer to one another. For concision, description thereof will not be repeated.

Meanwhile, for ease of description, the dimensions of the various parts shown in the accompanying drawings are not drawn in actual scale.

Descriptions of at least one exemplary embodiment below are illustrative only and do not serve as any limitation to the present disclosure as well as the application or use thereof. Technologies, methods, and devices known by a person of ordinary skills in the related arts are not discussed in detail herein. However, where appropriate, the technologies, the methods, and the devices shall be regarded as a part of the specification.

It should be noted that similar signs and letters in the following accompanying drawings indicate similar items. Therefore, once a certain item is defined in one of the accompanying drawings, there is no need to further discuss the item in the subsequent accompanying drawings.

The embodiments of the present disclosure may be applicable to electronic devices such as a terminal device, a computer system, a server, and the like, which may be operated together with numerous other general-purpose or special-purpose computing system environments or configurations. Well-known examples of the terminal device, the computing system, and environment and/or configuration applicable to be used with the electronic devices such as the terminal device, the computer system, and the server, include, but are not limited to, a personal computer system, a server computer system, a thin client, a thick client, a handheld or laptop device, a microprocessor-based system, a set-top box, programmable consumer electronics, a network personal computer, a small computer system, a mainframe computer system, and a distributed cloud computing technology environment including any of the foregoing systems, and the like.

The electronic devices such as the terminal device, the computer system, the server, and the like may be described in a general context of computer system-executable instructions (such as a program module executed by a computer system. Typically, the program module may, include a routine, a program, a target program, a component, logic, a data structure, and the like that execute particular tasks or implement specific types of abstract data. The computer system/server may be implemented in a distributed cloud computing environment, where a task is performed by a remote processing device linked through a communication network. In the distributed cloud computing environment, the program module may be located on a storage medium of a local or remote computing system including a storage device.

Application Overview

The visual image processing technology may be implemented by an artificial intelligence (AI) visual image processing system. The system may perform operations including image acquisition, image signal processing (ISP), image pyramid generation, whole image detection, ROI processing, post-processing, result output, and the like.

After the whole image detection is completed, ROI images for particular tasks may be generated. For example, an ROI image for a face detection task (which is a face image detected from a whole image) and a ROI image for a pedestrian detection task may be generated. The ROI image generated through the whole image detection needs to be provided to an image processing model, so that the image processing model performs the ROI processing. The image processing model may be a convolutional neural network model.

Since the ROI image generated through the whole image detection is generated while the system is running, the position and the size thereof cannot be predicted in advance. Due to the settings made by a model designer, the image processing model generally has requirements on an input image. For example, the image processing model has requirements on a size of the input image. Therefore, it is necessary to scale the ROI image generated through the whole image detection to satisfy the requirements on size. Specifically, scaling of the ROI image may be implemented by a hardware module, which may be referred to as an image scaling module or a resizer module. Theoretically, the input size of the image scaling module is the size of the ROI image generated through the whole image detection, and the output size of the image scaling module satisfies the requirements of the image processing model on the size of the input image.

It should be noted that in practice, whether it is in an AI vision image processing system including a central processing unit (CPU), a field-programmable gate array (FPGA), graphics processing unit (GPU), or a system including an application specific integrated circuit (ASIC), hardware resources of the image scaling module are always limited, and output of the image scaling module is restricted. In this case, the image scaling module does not perform scaling processing on part of the ROI images, but merely outputs an error prompt. In this case, the subsequent processes involved in the visual image processing technology cannot be executed normally.

Exemplary System

As shown in FIG. 1, the embodiments of the present disclosure may include two phases mainly, which are a compiling phase and a running phase respectively. At the compiling phase, a method for generating instructions for image processing provided in an embodiment of the present disclosure may be performed to generate instructions for implementing an image processing method provided in an embodiment of the present disclosure. At the running phase, for any ROI image obtained through whole image detection, the image processing method provided in the embodiment of the present disclosure may be implemented based on the instructions generated at the compiling phase, to address the problem that the subsequent processes involved in the visual image processing technology cannot be normally executed due to the output limitation of the image scaling module.

Exemplary Method

Figure 2:
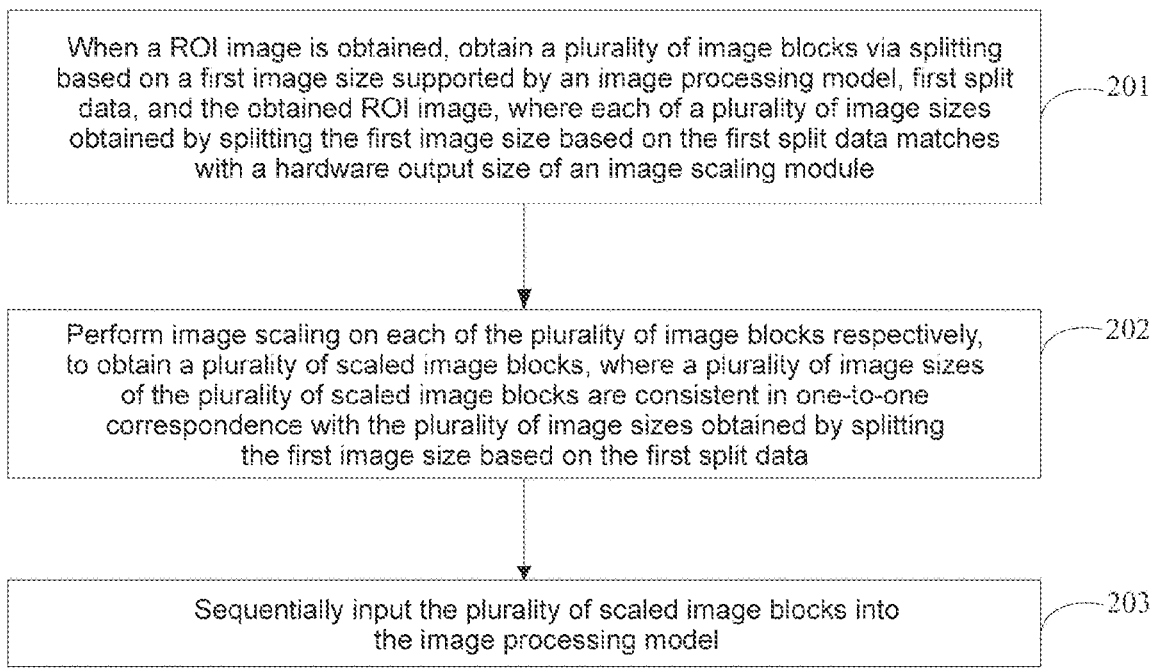
FIG. 2 is a schematic flowchart of an image processing method according to an exemplary embodiment of the present disclosure.

FIG. 2 is a schematic flowchart of an image processing method according to an exemplary embodiment of the present disclosure. The method shown in FIG. 2 includes step 201, step 202, and step 203, each of which will be described below.

At step 201, when an ROI image is obtained, a splitting process is performed to obtain a plurality of image blocks based on a first image size supported by an image processing model, first split data, and the obtained ROI image, where each of a plurality of image sizes obtained by splitting the first image size based on the first split data matches with a hardware output size of an image scaling module.

In step 201, the ROI image may be first obtained through the whole image detection. Specifically, detection may be performed on the whole image shown in the left part of FIG. 3, so as to obtain an image having a height size h as shown in FIG. 3.

After the ROI image is obtained, the first image size supported by the image processing model and the first split data determined at the compiling phase may be obtained. Each of the plurality of image sizes obtained by splitting the first image size based on the first split data matches with the hardware output size of the image scaling module.

It should be noted that the first image size supported by the image processing model may indicate requirements of the image processing model on a size of an input image, and may be 244×244. The hardware output size of the image scaling module may indicate a maximum image size that can be output by the image scaling module, and may be 128×72. That an image size matches with the hardware output size of the image scaling module may refer to that the image size is smaller than the hardware output size of the image scaling module. For example, the hardware output size of the image scaling module is 128×72, while the image size is 76×76.

Figure 3:
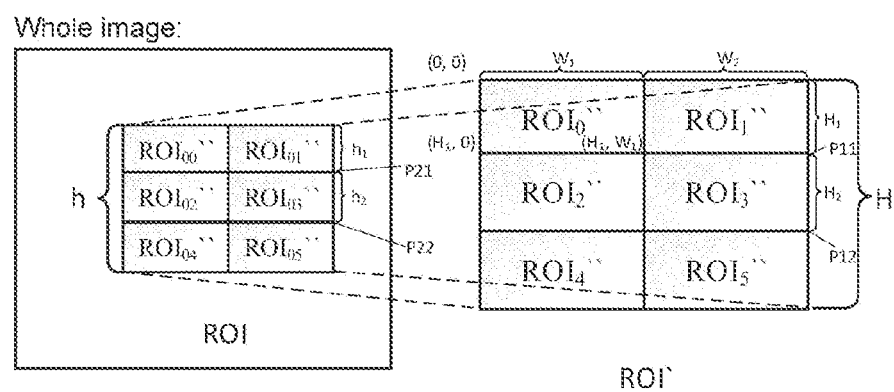
FIG. 3 is a schematic diagram illustrating the splitting operation at a running phase in an embodiment of the present disclosure.

In a specific example, the first image size is an image size of the image having a height size H as shown in the right part of FIG. 3. The first split data may be used to split the first image size into six image sizes, which respectively are an image size of $ROI_0''$, an image size of $ROI_1''$, an image size of $ROI_2''$, an image size of $ROI_3''$, an image size of $ROI_4''$, and an image size of $ROI_5''$. When the hardware output size of the image scaling module is 128×72, the image sizes of $ROI_0''$ to $ROI_5''$ all need to be smaller than 128×72.

After the first image size and the first split data are obtained, an object to be split and how to split the object to be split may be determined based on the first image size, the first split data, and the obtained ROI image, and splitting may be actually performed on this basis, so as to obtain a plurality of image blocks. If N image sizes are obtained by splitting the first image size based on the first split data, N image blocks may be actually obtained through splitting, where the N image sizes are in one-to-one correspondence with the N image blocks.

At step 202, image scaling is performed on each of the plurality of image blocks respectively, to obtain a plurality of scaled image blocks, where a plurality of image sizes of the plurality of scaled image blocks are consistent in one-to-one correspondence with the plurality of image sizes obtained by splitting the first image size based on the first split data.

In step 202, the image scaling module may be invoked to perform image scaling on each of the plurality of image blocks. During scaling, it needs to be ensured that the image size of the scaled image block obtained by scaling an image block is consistent with one of the plurality of image sizes obtained by splitting the first image size based on the first split data and that is corresponding to the image block.

Still taking FIG. 3 as an example, the first split data is used to split the first image size into six image sizes, and the six image sizes respectively are the image sizes of $ROI_0''$ to $ROI_5''$. The plurality of image blocks $ROI_{00}''$ to $ROI_{05}''$ are obtained through splitting in step 201. By invoking the image scaling module, the image block $ROI_{00}''$ may be scaled to have an image size of $ROI_0''$; the image block $ROI_{01}''$ may be scaled to have an image size of $ROI_1''$; the image block $ROI_{02}''$ may be scaled to have an image size of $ROI_2''$; the image block $ROI_{03}''$ may be scaled to have an image size of $ROI_3''$; the image block $ROI_{04}''$ may be scaled to have an image size of $ROI_4''$; and the image block $ROI_{05}''$ may be scaled to have an image size of $ROI_5''$, so as to obtain scaled image blocks respectively corresponding to $ROI_{00}''$ to $ROI_{05}''$. In this way, a total of six scaled image blocks may be obtained.

At step 203, the plurality of scaled image blocks are sequentially input to the image processing model.

In step 203, the plurality of scaled image blocks may be sequentially input into the image processing model. In this way, the image processing model may process each scaled image block respectively, for example, perform face detection or pedestrian detection, to obtain a processing result of each scaled image block. The processing results of all scaled image blocks may form a final processing result. The plurality of image sizes of the plurality of scaled image blocks are consistent in one-to-one correspondence with the plurality of image sizes obtained by splitting the first image size based on the first split data. Therefore, the final processing result is equivalent to a result obtained by processing a certain image having the first image size by the image processing model. Subsequently, the final processing result may be used in other processes involved in the visual image processing technology.

In this embodiment of the present disclosure, when the ROI image is obtained, a plurality of image blocks may be obtained through splitting based on the first image size supported by the image processing model, the first split data, and the obtained ROI image. Subsequently, image scaling may be performed on each of the plurality of image blocks respectively, to obtain a plurality of scaled image blocks. Because the plurality of image sizes of the plurality of scaled image blocks are consistent in one-to-one correspondence with the plurality of image sizes obtained by splitting the first image size based on the first split data, the image size of each of the plurality of scaled image blocks matches with the hardware output size, Thus, all scaled image blocks can be normally output from the image scaling module, and then the plurality of scaled image blocks are sequentially and normally input into the image processing model. As such, in this embodiment of the present disclosure, even if the output of the image scaling module is restricted, by using the first split data and combining with the image splitting operation and the image scaling operation, the plurality of scaled image blocks can be normally output from the image scaling module, and the plurality of scaled image blocks can be provided to the image processing model for normal processing, thereby ensuring the subsequent processes involved in the visual image processing technology are executed normally.

Figure 4:
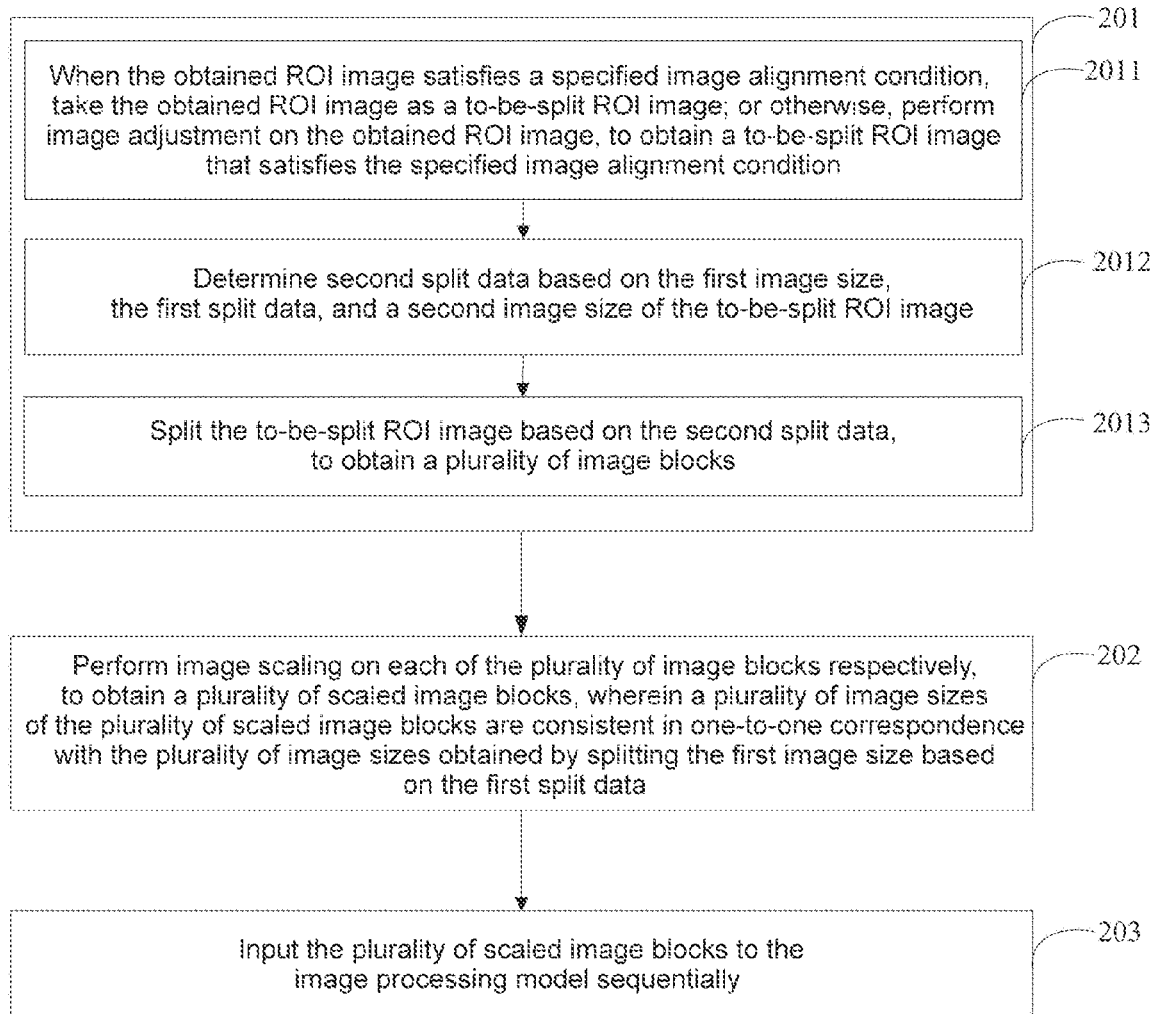
FIG. 4 is a schematic flowchart of an image processing method according to another exemplary embodiment of the present disclosure.

As shown in FIG. 4, step 201 includes step 2011, step 2022, and step 2023 on the basis of the foregoing embodiment shown in FIG. 2.

At step 2011, when the obtained ROI image satisfies a specified image alignment condition, the obtained ROI image is used as a to-be-split ROI image; or otherwise, image adjustment is performed on the obtained ROI image, to obtain a to-be-split ROI image that satisfies the specified image alignment condition.

Herein, after the ROI image is obtained, it can be determined whether the ROI image satisfies the specified image alignment condition. The specific determination is described below in examples.

In a specific implementation, the method further includes:
  obtaining a first target value, where the first target value is determined based on a divisor, specified by the image scaling module, of a value of a size in a preset direction, and a value of size in the preset direction in the first image size;
  determining whether a value of size of the obtained ROI image in the preset direction is an integer multiple of the first target value, to obtain a first determination result; and determining, based on the first determination result, whether the obtained ROI image satisfies the specified image alignment condition.

It should be noted that the first target value may be a value determined at the compiling phase based on the divisor, specified by the image scaling module, of the value of the size in the preset direction, and the value of the size in the preset direction in the first it e size. The first target value is used to indicate a user alignment requirement (for ease of differentiation, the user alignment requirement is referred to as a first user alignment requirement below, and the first user alignment requirement may be considered as a size alignment requirement). Herein, user alignment may also be referred to as user alignment. For the specific process of determining the first target value, reference may be made to the description of the corresponding part of the compiling phase below, and details are not described herein.

Herein, the preset direction may include at least one of a width direction and a height direction. Since a calculation process for the width direction may be similar to that for the height direction, in this embodiment of the present disclosure, description is merely made by using an example in which the preset direction is a height direction. In this case, a size in the preset direction is specifically a height size.

In this implementation, a runtime application programming interface (Runtime API) may be invoked to obtain the first target value determined at the compiling phase, and it may be determined whether a height size of the obtained ROI image is an integer multiple of the first target value, thereby obtaining the first determination result. If the first determination result indicates that the height size of the obtained ROI image is an integer multiple of the first target value, it may be considered that the obtained ROI image satisfies the first user alignment requirement. During the actual splitting, if the obtained ROI image can be correctly split, it may be determined that the obtained ROI image satisfies the specified image alignment condition; or otherwise, it may be determined that the obtained ROI image does not satisfy the specified image alignment condition.

In this implementation, it is possible to accurately evaluate whether the obtained ROI image satisfies the first user alignment requirement based on the first target value, thereby reliably determining whether the obtained ROI image satisfies the specified image alignment condition.

In another specific implementation, the method further includes:

obtaining a coordinate of a preset position on the obtained ROI image;

determining whether the coordinate of the preset position has a coordinate attribute specified by the image scaling module, to obtain a second determination result; and determining, based on the second determination result, whether the obtained ROI image satisfies the specified image alignment condition.

It should be noted that the coordinate attribute specified by the image scaling module may indicate another user alignment requirement (for ease of differentiation, the another user alignment requirement is referred to as a second user alignment requirement below; and the second user alignment requirement may be considered as a coordinate alignment requirement). Optionally, the coordinate attribute specified by the image scaling module may be that the coordinate of the preset position is an even number, where the preset position may be a position at an upper left corner, a position at an upper right corner, or another position.

In this implementation, after the coordinate of the preset position on the obtained ROI image is obtained, it may be determined whether the coordinate of the preset position has the coordinate attribute specified by the image scaling module, to obtain the second determination result. If the second determination result indicates that the coordinate of the preset position has the coordinate attribute specified by the image scaling module, it may be considered that the obtained ROI image satisfies the second user alignment requirement, and the obtained ROI image can be processed normally by the image scaling module. In this case; it may be determined that the obtained ROI image satisfies the specified image alignment condition; or otherwise, it may be determined that the obtained ROI image does not satisfy the specified image alignment condition.

In this implementation, it is possible to accurately evaluate whether the obtained ROI image satisfies the second user alignment requirement based on the coordinate of the preset position on the obtained ROI image, thereby reliably determining whether the obtained ROI image satisfies the specified image alignment condition.

It should be noted that the foregoing two implementations for determining Whether the obtained ROI image satisfies the specified image alignment condition may also be combined with each other. For example, if the height size of the obtained ROI image is an integer multiple of the first target value and the obtained. ROI image has the coordinate attribute specified by the image scaling module, it is determined that the obtained ROI image satisfies the specified image alignment condition; or otherwise, it is determined that the obtained ROI image does not satisfy the specified image alignment condition.

After determining whether the obtained ROI image satisfies the specified image alignment condition, if a determination result is yes, the obtained ROI image may be directly, taken as the to-be-split ROI image; and if the determination result is no, image adjustment may be performed on the obtained ROI image, to obtain the to-be-split ROI image that satisfies the specified image alignment condition. In a case where the determination result is no, a new ROI image can be taken from the whole image as a to-be-split image with regard to the position of the obtained ROI image on the whole image; or the obtained ROI image may be cropped slightly, and the cropped ROI image may be taken as the to-be-split ROI image.

At step 2012, second split data is determined based on the first image size, the first split data, and a second image size of the to-be-split ROI image.

In a specific implementation, step 2012 includes:

determining, based on the first split data, splitting positions in a preset direction of a template image having the first image size;

determining a proportional relationship between a size in the preset direction in the second image size of the to-be-split ROI image and a size in the preset direction in the first image size;

determining splitting positions in the preset direction of the to-be-split ROI image based on the proportional relationship and the splitting positions in the preset direction of the template image; and determining the second split data based on the splitting positions in the preset direction of the to-be-split ROI image.

Herein, the first split data nay include coordinate information of each splitting position in the height direction; and/or the first split data may include a proportional relationship between size segments split in the height direction (for example, 3:3:2 or 3:4:3). In this way, based on the first split data, it is possible to conveniently and reliably determine the respective splitting positions in the height direction of the template image having the first image size.

Herein, a proportional relationship between a height size of the to-be-split ROI image and a height size in the first image size may also be determined. Supposing that the to-be-split ROI image is the image having the height size h as shown in the left part of FIG. 3, and the template image having the first image size is the image having the height size as shown in the right part of FIG. 3, the determined proportional relationship is h/H.

After determining the splitting positions in the height direction of the template image and the proportional relationship between the height size of the to-be-split ROI image and the height size in the first image size, the splitting positions in the height direction of the template image may be mapped onto the to-be-split ROI image according to the determined proportional relationship, to obtain mapping positions in the height direction of the to-be-split ROI image. Each of the obtained mapping positions may respectively serve as a splitting position in the height direction of the to-be-split ROI image.

Still taking FIG. 3 as an example, there may be two splitting positions in the height direction of the template image, which are position P11 and position P12 respectively. In this case, the position P11 may be mapped onto the to-be-split ROI image, and a corresponding mapping position may be position P21; and the position P12 may also be mapped onto the to-be-split ROI image, and a corresponding mapping position may be position P22, It should be noted that because H is divided into three segments $H_1$, $H_2$, and $H-H_1-H_2$ by the positions P11 and P12, h may be divided into three segments $h_1$, $h_2$, and $h-h_1-h_2$ by the positions P21 and P22. Because mapping is performed according to the proportional relationship, $h_1$ and $h_2$ satisfy: $h_1=H_1h/H$, and $h_2=H_2h/H$.

After determining the splitting positions in the height direction of the to-be-split ROI image, the second split data may be determined accordingly. Optionally, the second split data may include coordinate information of each splitting position in the height direction of the to-be-split ROI image; and/or the second split data may include a proportional relationship, for example, $h_1:h_2:h-h_1-h_2$, between the respective size segments split in the height direction of the to-be-split ROI image.

In this implementation, based on the first split data, it is possible to accurately and reliably determine the respective splitting positions on the template image having the first image size. Further, in combination with the proportional relationship between the to-be-split ROI image and the first image size, the splitting positions on the to-be-split ROI image can be accurately and reliably determined, so that the second split data can be obtained accordingly.

At step 2013, the to-be-split ROI image is split based on the second split data, to obtain a plurality of image blocks.

Each of the splitting positions in the height direction of the to-be-split ROI image is closely related to the second split data. Therefore, according to the second split data, splitting may be performed at each splitting position in the height direction. In a similar manner, splitting may also be performed in the width direction, so as to obtain a plurality of image blocks based on the splitting in both the height direction and the width direction.

In this embodiment of the present disclosure, the to-be-split ROI image that satisfies the specified image alignment condition may be first obtained based on the obtained ROI image; subsequently, the second split data indicating how to split is determined; and then, the to-be-split ROI image is actually split based on the second split data. As such, an object to be split satisfies the user alignment requirement, and split data used in the actual splitting is adapted to the object to be split, thereby ensuring correct and effective implementation of a splitting operation.

It should be noted that in the prior art, as shown in FIG. 5A, a workflow of an AI vision image processing system may be as follows: first, image acquisition, ISP, image pyramid generation, and whole image detection are performed sequentially, to generate ROI images fir particular tasks; subsequently, before providing the ROT image generated through the whole image detection to the image scaling module, it is predicted whether a scaled image (assuming that the scaled image is represented by ROI') obtained from the image scaling module by scaling the ROI image generated through the whole image detection satisfies a restriction. If the constraint is satisfied, the ROI image generated through the whole image detection is sent to the image scaling module for a scaling operation to obtain ROI'; the image processing model processes the ROI'; and then, operations such as post-processing and result output may be performed. If the restriction is not satisfied, an error prompt such as an error message, an alarm signal, or an alerting signal may be output. It is obvious that in the prior art, for the case where the output of the image scaling module is restricted, only a prompt signal is output, and no effective solution is taken.

In this embodiment of the present disclosure, as show in FIG. 5B, the workflow of the AT vision image processing system may be slightly different from that of the prior art. Specifically, if it is predicted that the ROI' does not satisfy the restriction, alignment processing (to meet the foregoing user alignment requirements) and splitting processing (for example, splitting the ROI' into several pieces having the size that the image scaling module is capable of outputting) may be performed. As such, according to this embodiment of the present disclosure; it is possible to ensure the normal execution of the subsequent processes involved in the visual image processing technology even when the output of the image scaling module is restricted.

Any one of the image processing methods provided in this embodiment of the present disclosure may be implemented by any suitable device having data processing capabilities, including but not limited to a terminal device and a server and the like. Alternatively, any one of the image processing methods provided in this embodiment of the present disclosure may be implemented by a processor. For example, the processor implements any one of the image processing methods described in this embodiment of the present disclosure by invoking corresponding instructions stored in a memory. Details are not described hereafter.

Figure 6:
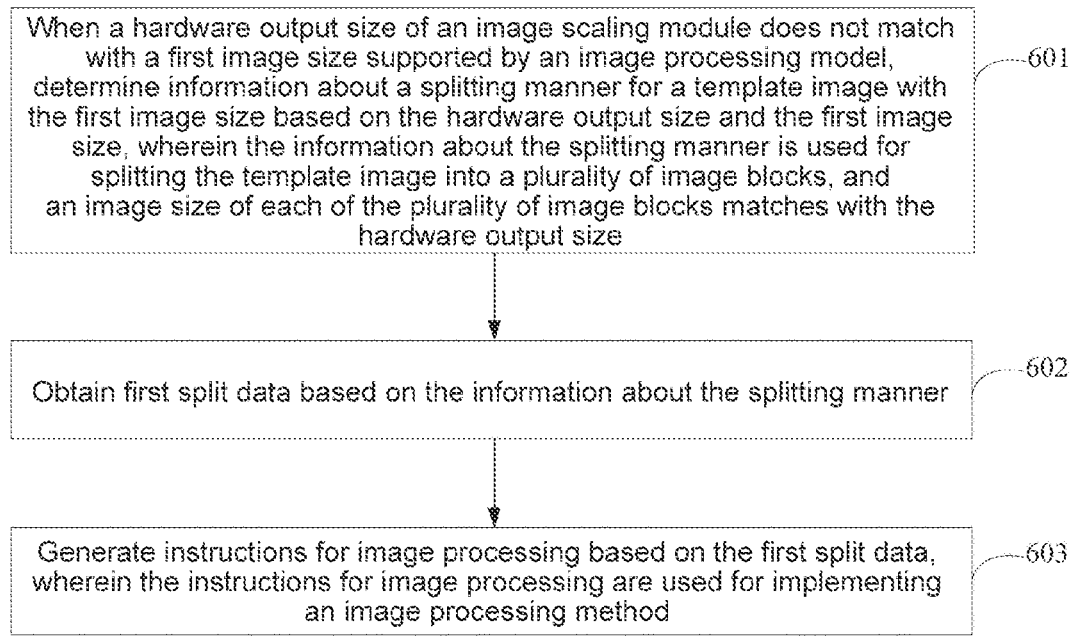
FIG. 6 is a schematic flowchart of a method for generating instructions for image processing according to an exemplary embodiment of the present disclosure.

FIG. 6 is a schematic flowchart of a method for generating instructions for image processing according to an exemplary embodiment of the present disclosure. The method shown in FIG. 6 includes step 601, step 602, and step 603. Each of the steps will be described below.

At step 601, when a hardware output size of the image scaling module does not match with a first image size supported by the image processing model, information about a splitting manner for a template image having the first image size is determined based on the hardware output size and the first image size, where the information about the splitting manner is used for splitting the template image into a plurality of image blocks, and the image size of each of the plurality of image blocks matches with the hardware output size.

It should be noted that the hardware output size of the image scaling module may indicate a maximum image size that the image scaling module is capable of outputting. The first image size supported by the image processing model may indicate requirements of the image processing model on a size of an input image. That the hardware output size of the image scaling module does not match with the first image size supported by the image processing model may refer to that the hardware output size of the image scaling module is smaller than the first image size supported by the image processing model. For example, the hardware output size of the image scaling module is 128×72, while the first image size supported by the image processing model is 244×244. That an image size matches with the hardware output size of the image scaling module may refer to that the image size is smaller than the hardware output size of the image scaling module.

When the hardware output size of the image scaling module does not match with the first image size supported by the image processing model, it may be determined, based on the hardware output size and the first image size, how to split a template image having the first image size for example, the image shown in the right part of FIG. 3 having a height size H). As such, it may be ensured that the image size of each of the plurality of image blocks obtained through splitting matches with the hardware output size of the image scaling module, thereby obtaining the corresponding information about the splitting manner.

Optionally, the information about the splitting manner may include coordinate information of each splitting position in a width direction and coordinate information of each splitting position in a height direction, and/or the information about the splitting manner may include a proportional relationship between size segments split in the width direction and a proportional relationship between size segments split in the height direction.

Optionally, in determining the information about the splitting manner, other factors, in addition to the hardware output size of the image scaling module and the first image size supported by the image processing model, may be further referred to. For example, reference may be made to a specific type of instructions using the template image, a storage location of the template image in a memory, and memory allocation and management rules of a compiler during running.

At step 602, first split data is obtained based on the information about the splitting manner.

Herein, data including all the information in the information about the splitting manner may be taken as the first split data; or partial information may be extracted from the information about the splitting manner, and data including the extracted partial information may be taken as the first split data. For example, when the information about the splitting manner includes both the coordinate information of the splitting position and the proportional relationship between the size segments, the coordinate information of the splitting position may be extracted from the information about the splitting manner, and data including the extracted coordinate information of the splitting position may be taken as the first split data.

At step 603, instructions for image processing are generated based on the first split data, where the instructions for image processing are used for implementing the image processing method (specifically, the image processing method disclosed in the foregoing embodiment of the present disclosure).

It should be noted that steps 601 to 603 may all be performed by a compiler.

In this embodiment of the present disclosure, when the hardware output size of the image scaling module does not match with the first image size supported by the image processing model, the information about the splitting manner for the template image having the first image size may be determined based on the hardware output size and the first image size. After the first split data is obtained based on the information about the splitting manner, the instructions for image processing may be generated based on the first split data, Where the instructions may be used for implementing the foregoing image processing method. In this way, by implementing the foregoing image processing method using the first split data in combination with an image splitting operation and an image scaling operation, it is possible to ensure the normal execution of the subsequent processes involved in the visual image processing technology, even if the output of the image scaling module is restricted.

Figure 7:
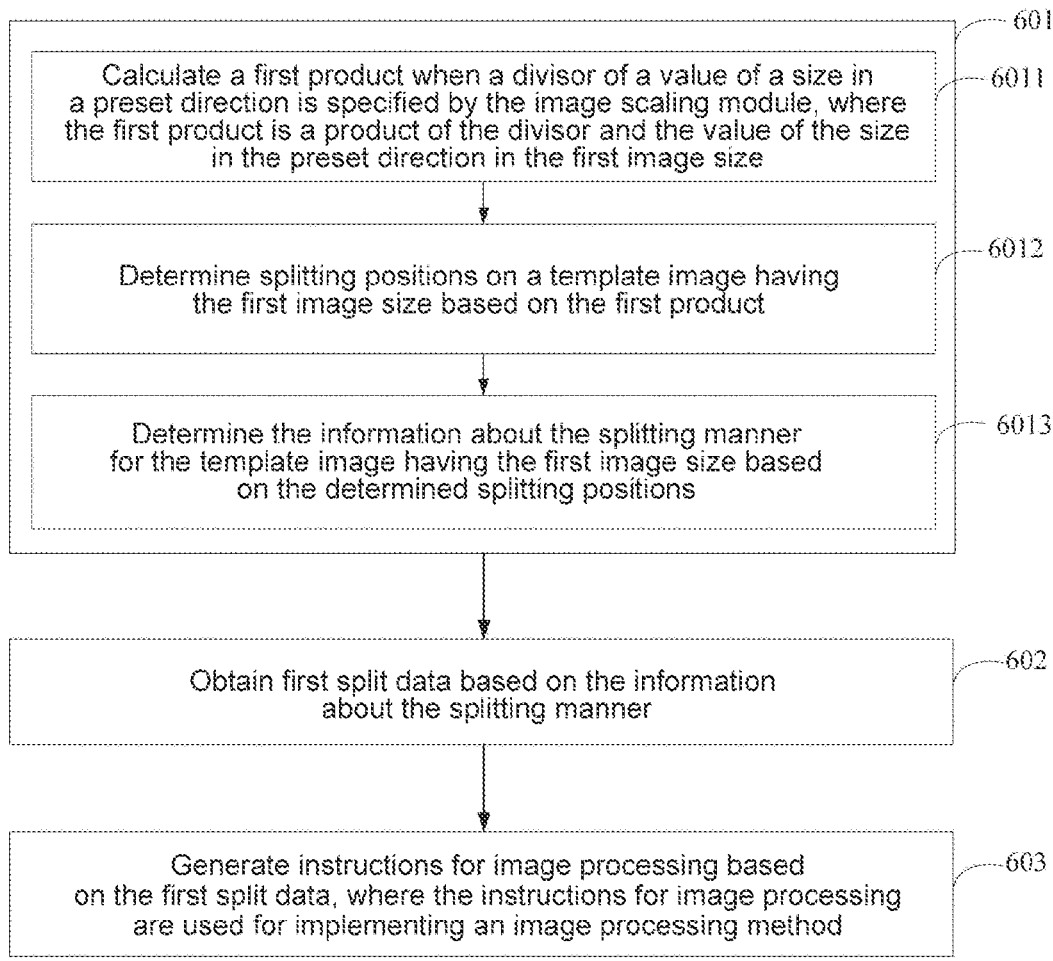
FIG. 7 is a schematic flowchart of a method for generating instructions for image processing according to another exemplary embodiment of the present disclosure.

As shown in FIG. 7, step 601 includes step 6011, step 6012, and step 6013 on the basis of the foregoing embodiment shown in FIG. 6.

At step 6011, a first product is calculated when a divisor of a value of a size in a preset direction is specified by the image scaling module, where the first product is a product of the divisor and the value of the size in the preset direction in the first image size.

Herein, the preset direction may include at least one of a width direction and a height direction. Since a calculation process for the width direction may be similar to that for the height direction, in this embodiment of the present disclosure, description is merely made by using an example in which the preset direction is a height direction. In this case, the size in the preset direction is specifically the height size.

Herein, if the divisor of the height size that is specified by the image scaling module is represented by c, and the value of the first image size is represented by H as shown in FIG. 3, the first product may be represented by cH, where c may be considered as a hardware alignment requirement of the image scaling module.

At step 6012, splitting positions on a template image having the first image size are determined based on the first product.

In a specific implementation, step 6012 includes:

determining a first target value and a second target value based on the first product, where a product of the first target value and the second target value satisfies a preset relationship with the first product; and determining the splitting positions on the template image having the first image size based on the second target value, where in the preset direction of the template image, size value for each of the size segments obtained through dividing by using the determined splitting positions is an integer multiple of the second target value.

The method further includes:

recording the first target value.

It should be noted that, that a product satisfies the preset relationship with the first product may refer to that the product is equal to the first product.

In this implementation, after determining the first target value and the second target value based on the first product, the first target value may be recorded. In this case, the recorded first target value may be obtained at a running phase, so that determination related to the specified image alignment condition may be made based on the first target value. In addition, the splitting positions on the template image having the first image size may be determined based on the second target value. During the determination, it needs to be ensured that in the height direction of the template image, size value for each of the size segments obtained through dividing by using the determined splitting positions is an integer multiple of the second target value. For example, in FIG. 3, it needs to be ensured that each of $H_1$, $H_2$, and $H-H_1-H_2$ is an integer multiple of the second target value.

It is assumed that FIG. 3 satisfies the following conditions.
(1) if $H_1$ and $H_2$ satisfy alignment A, $H_1=n_1 A$ and $H_2=n_2 A$. That is, each of $H_1$ and $H_2$ is an integer multiple of A.
(2) If h satisfies alignment a, $h=n_3 a$. That is, his an integer multiple of a.
(3) If $h_1$ at least satisfies hardware alignment requirements of the image scaling module, $h_1=n_4 c$. That is, $h_1$ is an integer multiple of c.
(4) The image scaling module scales an image having the height size h as shown in a left part in an equal proportion.

In this case, it may be satisfied that:

$$\frac{h}{H} = \frac{h_1}{H_1} = \frac{n_3 a}{H} = \frac{n_4 c}{n_1 A}.$$

By further simplifying, it may be satisfied that:

$$h_1 = \frac{n_1 n_3 a A}{H} = n_4 c.$$

Because $n_1$ and $n_3$ are uncontrollable positive integers, to ensure that $h_1$ satisfies alignment c, it needs to be ensured that $n_4$ is a positive integer. Therefore, it needs to be ensured that aA/H is a positive integer. In the case of most strict alignment requirements, $n_1=n_3=n_4=1$, which simplifies the foregoing equation even further to give:

$aA=cH$

It should be noted that A may be considered as a size alignment value of a compiler splitting point (which corresponds to the splitting position), and a may be considered as a size alignment value of a ROI image (for example, the to-be-split ROI image described above) provided to the image scaling module. According to the foregoing equation, it may be inversely, deduced that as long as a product of the size alignment value A of the compiler splitting point and the size alignment value a of the ROI image provided to the image scaling module by a user is equal to a product of the hardware alignment requirement c of the image scaling module and a size in a corresponding direction (herein, specifically the size H in the height direction) in the first image size supported by the image scaling module (this product may be represented by cH, and is equivalent to the first product described above), it may be ensured that when the splitting positions on the template image are mapped back to the to-be-split ROI image, the splitting positions on the to-be-split ROI image satisfy the size alignment requirements (specifically, alignment a is satisfied). In this case, provided that the to-be-split ROI image satisfies the alignment a, the to-be-split ROI image can be calculated correctly and efficiently.

Accordingly, a may be taken as the first target value, and A may be taken as the second target value, to ensure that the to-be-split ROI image can be correctly split at a running phase. Each of the image blocks obtained through splitting may satisfy the size alignment requirement. In other words, a height size of each of the image blocks obtained through splitting is an integer multiple of a that serves as the first target value.

At step 6013, the information about the splitting manner for the template image having the first image size is determined based on the determined splitting positions.

After the various splitting positions are determined, corresponding coordinate information of the splitting positions may be obtained, so as to obtain the information about the splitting manner including the obtained coordinate information of the splitting positions. Certainly, the proportional relationship between the size segments may also be obtained, so as to obtain the information about the splitting manner including the obtained proportional relationship.

In this embodiment of the present disclosure, when the divisor of the value of the size in the preset direction is specified by the image scaling module, the first product (that is, the cH described above) may be calculated, and the appropriate first target value and second target value may be determined by using the first product as guide information, to ensure that the image can be correctly split at the running phase and that the split result satisfies the size alignment requirements.

In an optional example, determining the first target value and the second target value based on the first product includes:
   determining at least one reference parameter group based on the first product, where each of the at least one reference parameter group includes two values, and a product of the two values in any reference parameter group satisfies a preset relationship with the first product;
   selecting a first reference parameter group from the at least one reference parameter group; and
   taking a value in the first reference parameter group as the first target value, and taking the other value in the first reference parameter group as the second target value.

Herein, at least one reference parameter group may be first determined. Each reference parameter group includes two values, and a product of the two values in any reference parameter group is equal to the first product. Optionally, the at least one reference parameter group may be obtained by factoring the first product.

Subsequently, the first reference parameter group may be selected from the at least one reference parameter group. Optionally, a reference parameter group may be selected, according to a predetermined rule, from the at least one reference parameter group as the first reference parameter group. In this case, selecting the first reference parameter group from the at least one reference parameter group may include:
   calculating a total alignment-cost value for each of the at least one reference parameter group, respectively; and
   selecting a reference parameter group corresponding to a smallest total alignment-cost value as the first reference parameter group.

Herein, the total alignment-cost value for each reference parameter group may be respectively calculated. The total alignment-cost value may include an alignment-cost value for the compiler and an alignment-cost value for the user. Subsequently, by comparing the total alignment-cost values of the reference parameter groups, the reference parameter group corresponding to the smallest total alignment-cost value may be selected out, and then the resulting reference parameter group is taken as the first reference parameter group.

In this implementation, by taking the reference parameter group having the smallest total alignment-cost value as the first reference parameter group, it is possible to minimize costs while ensuring that both the compiler and the user satisfy the corresponding alignment requirements.

Certainly, an implementation of selecting the first reference parameter group is not limited thereto. For example, a reference parameter group may be randomly selected from the at least one reference parameter group as the first reference parameter group.

After the first reference parameter group is selected, the first target value and the second target value may be conveniently determined. Because the first reference parameter group is selected from the at least one reference parameter group, while the at least one reference parameter group is determined based on a product, it may be ensured that both the compiler and the user satisfy the corresponding alignment requirements.

In an optional example, calculating the total alignment-cost value for each of the at least one reference parameter group respectively includes:
  determining splitting positions in the preset direction of the template image based on a larger one of the two values included in any one of the at least one reference parameter group, and calculating an alignment-cost value for each of the splitting positions; and
  calculating a sum of the obtained alignment-cost values, to obtain the total alignment-cost value of the reference parameter group.

Herein, for any one of the at least one reference parameter group (which is assumed to be a reference parameter group S), a larger one (which is assumed to be A') of the two values included therein may be first determined. Subsequently, splitting positions in the height direction of the template image may be determined by using A'. During the determination; it needs to be ensured that in the height direction of the template image, the size value for each of the size segments obtained through dividing by using the determined splitting positions is an integer multiple of A'. Subsequently, the alignment-cost value for each of the splitting positions in the height direction of the template image may be calculated.

In a specific implementation, calculating the alignment-cost value for each of the splitting positions includes:
  obtaining a coordinate in the preset direction in the coordinates of any one of the splitting positions;
  calculating a result of a remainder operation for the obtained coordinate and the larger one of the two values included in any reference parameter group;
  calculating a ratio of the first product and the larger one of the two values included in the reference parameter group;
  calculating a difference between the ratio and a preset value; and
  calculating a weighted sum of the result of the remainder operation and the difference based on a preset adjustment factor, to obtain the alignment-cost value for the one splitting position.

Herein, the preset value may be 1, 2, 3, or other values; and the preset adjustment factor may be represented by p.

Still, the case in which the any reference parameter group is the reference parameter group S and the larger one of the two values included in the reference parameter group is A' is used as an example. Assuming that a coordinate in the height direction in the coordinates of a certain splitting position on the template image determined by using A' is represented by a result of a remainder operation for y and A' may be calculated, and then may be represented by roi.y % A'. In addition, a ratio of the first product cH to A' may be calculated, and a difference between the ratio and the preset value (which is assumed to be 1) may be further calculated. The difference may be represented by $$\frac{cH}{A'} - 1.$$

Subsequently, based on the preset adjustment factor p, a weighted sum of the result of the remainder operation, roi.y % A', and the difference $$\frac{cH}{A'} - 1$$

may be calculated. Specifically, in calculating the weighted sum, p may be used as weight of the result of the remainder operation, roi.y % A', and p−1 may be used as weight of the difference $$\frac{cH}{A'} - 1,$$

thereby obtaining the alignment-cost value of a certain splitting position. The alignment-cost value of the splitting position may be represented by f(A'), and may be calculated by using the following cost function:

$$f(A') = p(roi.y \% A') + (1-p)\left(\frac{cH}{A'} - 1\right)$$

It should be noted that in the above cost function, the operation item prior to "+" represents the alignment-cost value for the compiler, and the operation item following "+" is the alignment-cost value for the user in a theoretically worst case. By using the above cost function, it is possible to accurately and reliably determine the alignment-cost value of an individual splitting position.

Assuming that G splitting positions in the height direction of the template image are determined by using A', the alignment-cost value for each of the G splitting positions may be respectively calculated according to the foregoing manner, thereby obtaining G alignment-cost values, Subsequently, a sum of the G alignment-cost values may be calculated, and the sum may be used as a total alignment-cost value of the reference parameter group S. It should be noted that total alignment-cost values of the reference parameter groups may be compared subsequently. If the total alignment-cost value of the reference parameter group S is the smallest, the reference parameter group S may be used as the first reference parameter group. In this case, A' may represent the first target value or A described above, and cH/A' may represent the second target value or a described above.

In this embodiment of the present disclosure, by taking a sum of the alignment-cost values, it is possible to obtain the total alignment-cost value of each reference parameter group conveniently and reliably, thereby facilitating determination of the reasonable first target value and second target value.

It should be noted that, to prevent the compiler from paying too much for alignment, it is also possible to try to find a proper A heuristically, e.g., starting with a value of 4 and trying in turn to determine whether both the compiler and the user can satisfy the corresponding alignment requirements when the template image is split based on it. If the alignment requirements can be satisfied, this value is doubled, for example, to 8, 16, 32, or the like, and the process is continued to try to see whether a larger value can satisfy the corresponding alignment requirements, and find the largest value that is not greater than 32 and that can satisfy the alignment requirements.

In a specific example, the first image size supported by the image processing model is 66×68, that is, a width size is 66 and a height size is 68. Meanwhile, if the image scaling module requires that a coordinate of an upper left corner, a height size, and a width size of an input image are all even numbers, during splitting, the size alignment value A of a splitting point of the compiler and the size alignment value a of the ROI image provided to the image scaling module should satisfy:

$$aA=2\times66=132$$

It is obvious that if the compiler satisfies alignment of 2 (that is, the value of A is 2 the user needs to satisfy alignment of 66 (that is, a value of a is 66); if the compiler satisfies alignment of 4, the user needs to satisfy alignment of 33; and if the compiler satisfies alignment of 12, and the user needs to satisfy alignment of 11. Optionally, when using the heuristic manner to find the proper A, A may specifically be 4. In other words, the compiler satisfies the alignment of 4 and the user satisfies the alignment of 33.

Figure 8:
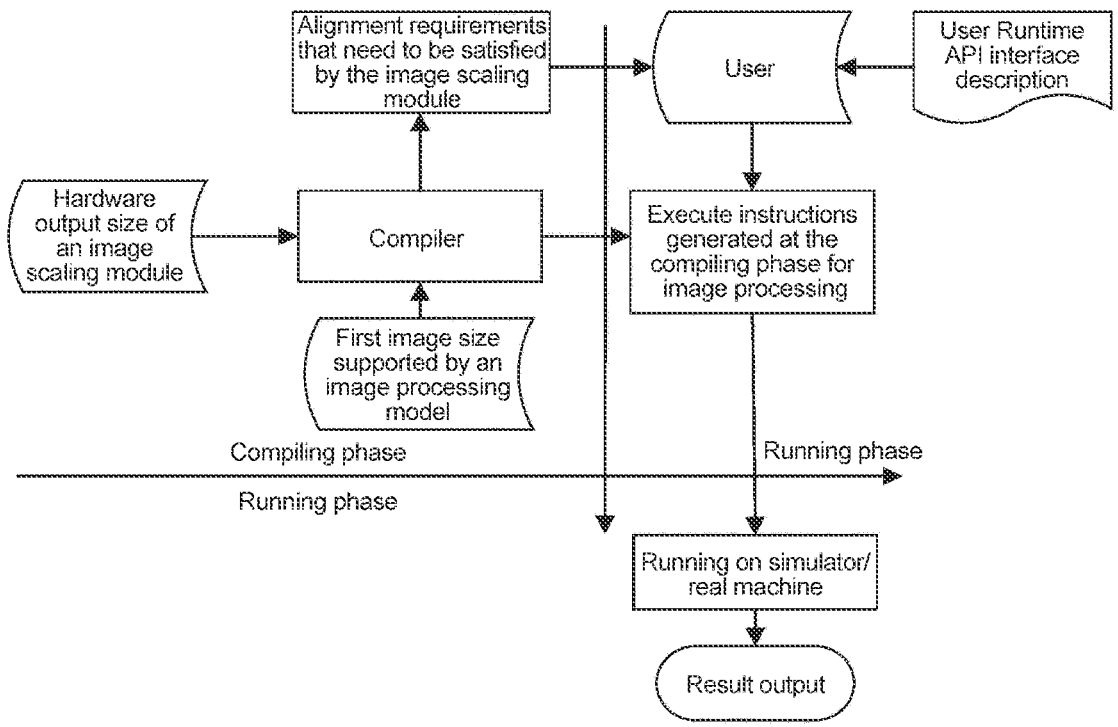
FIG. 8 is another overall schematic diagram according to an embodiment of the present disclosure.

In an optional example, as shown in FIG. 8, at the compiling phase, the alignment requirements (for example, the requirement that the coordinate of the upper left corner, the height size, and the width size are all even numbers) that need to be satisfied by the image scaling module, the hardware output size of the image scaling module, and the first image size supported by the image processing model need to be provided to the compiler. On this basis, the compiler calculates the alignment A that needs to be satisfied by the compiler, and meanwhile calculates the alignment a that needs to be satisfied by the user, records a, and splits the template image having the first image size to obtain the first split data. At the running phase, the user may obtain a via a Runtime API, and then perform corresponding alignment processing to obtain the to-be-split ROI image and perform subsequent processing, thereby ensuring correct and effective splitting of the to-be-split ROI image.

As above, in this embodiment of the present disclosure, the compiler may analyze hardware restrictions of the image scaling module and input requirements of the image processing model, to calculate how to satisfy the hardware restrictions at relatively small costs. The compiler may also provide splitting and alignment strategies to perform reasonable splitting and alignment on this basis. As such, it is ensured that the entire AI vision image processing system can run correctly and efficiently in the case where the hardware resources of the image scaling module are limited, thereby better ensuring user experience.

Any one of methods for generating instructions for image processing provided in this embodiment of the present disclosure may be implemented by any suitable device with data processing capabilities, including but not limited to terminal devices and servers. Alternatively, any one of methods for generating instructions for image processing provided in this embodiment of the present disclosure may be implemented by a processor. For example, the processor implements any one of methods for generating instructions for image processing described in this embodiment of the present disclosure by invoking corresponding instructions stored in a memory. Details will not be described herein again.

Exemplary Apparatuses

Figure 9:
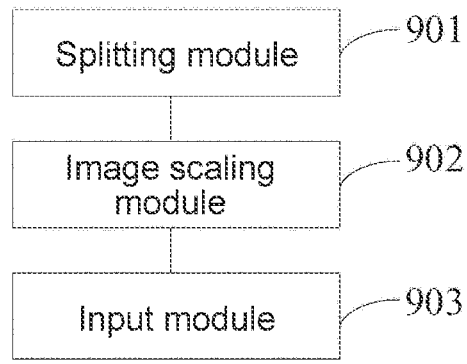
FIG. 9 is a schematic structural diagram of an image processing apparatus according to an exemplary embodiment of the present disclosure.

FIG. 9 is a schematic structural diagram of an image processing apparatus according to an exemplary embodiment of the present disclosure. The apparatus shown in FIG. 9 includes a splitting module 901, an image scaling module 902, and an input module 903.

The splitting module 901 is configured to perform splitting to obtain a plurality of image blocks, when a ROI image is obtained, based on a first image size supported by an image processing model, first split data, and the obtained ROI image, where each of a plurality of image sizes obtained by splitting the first image size based on the first split data matches with a hardware output size of the image scaling module 902.

The image scaling module 902 is configured to perform image scaling on each of the plurality of image blocks that are obtained by the splitting module 901 respectively, to obtain a plurality of scaled image blocks, where a plurality of image sizes of the plurality of scaled image blocks are consistent in one-to-one correspondence with the plurality of image sizes obtained by splitting the first image size based on the first split data.

The input module 903 is configured to input the plurality of scaled image blocks obtained by the image scaling module 902 sequentially to the image processing model.

Figure 10:
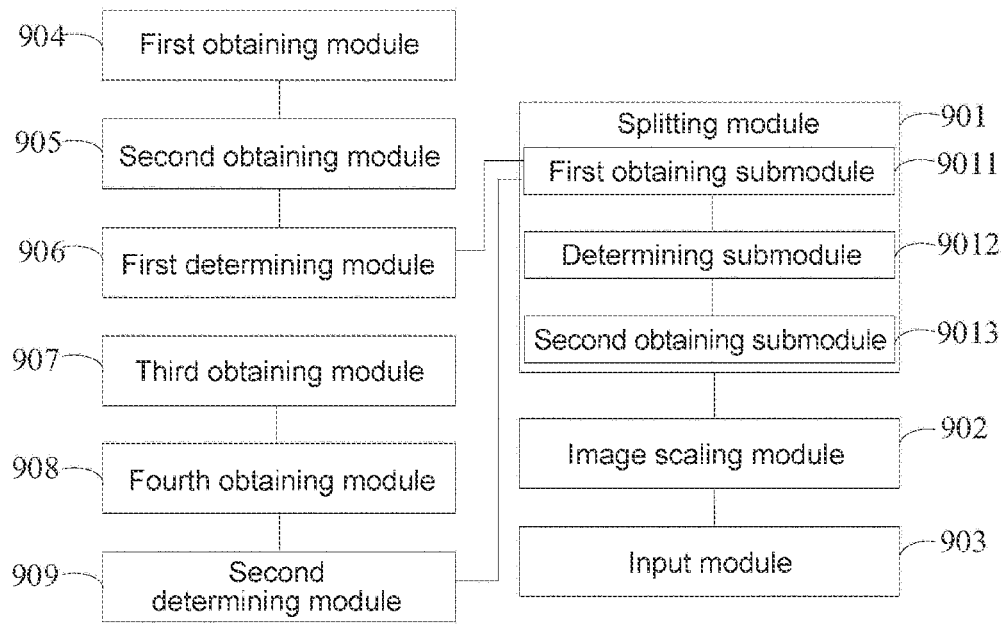
FIG. 10 is a schematic structural diagram of an image processing apparatus according to another exemplary embodiment of the present disclosure.

In an optional example, as shown in FIG. 10, the splitting module 901 includes:
  a first obtaining submodule 9011, configured to, when the obtained ROI image satisfies a specified image alignment condition, take the obtained ROI image as a to-be-split ROI image; or otherwise, perform image adjustment on the obtained ROI image, to obtain a to-be-split ROI image that satisfies the specified image alignment condition;
  a determining submodule 9012, configured to determine second split data based on the first image size, the first split data, and a second image size of the to-be-split ROI image obtained by the first obtaining submodule 9011; and
  a second obtaining submodule 9013, configured to split the to-be-split ROI image obtained by the first obtaining submodule 9011 based on the second split data determined by the determining submodule 9012, to obtain a plurality of image blocks.

In an optional example, the determining submodule 9012 includes:
  a first determining unit, configured to determine, based on the first split data, splitting positions in a preset direction of a template image having the first image size;
  a second determining unit, configured to determine a proportional relationship between a size in the preset direction in the second image size of the to-be-split ROI image and a size in the preset direction in the first image size;
  a third determining unit, configured to determine splitting positions in the preset direction of the to-be-split ROI image based on the proportional relationship determined by the second determining unit and the splitting positions in the preset direction of the template image determined by the first determining unit; and a fourth determining unit, configured to determine the second split data based on the splitting positions in the preset direction of the to-be-split ROI image that are determined by the third determining unit.

In an optional example, as shown in FIG. 10, the apparatus further includes:

a first obtaining module 904, configured to obtain a first target value, where the first target value is determined based on a divisor, specified by the image scaling module 902, of a value of a size in the preset direction, and a value of a size in the preset direction in the first image size;

a second obtaining module 905, configured to determine whether a size of the obtained ROI image in the preset direction is an integer multiple of the first target value obtained by the first obtaining module 904, to obtain a first determination result; and a first determining module 906, configured to determine, based on the first determination result obtained by the second obtaining module 905, whether the obtained ROI image satisfies the specified image alignment condition.

As shown in FIG. 10, the apparatus further includes:

a third obtaining module 907, configured to obtain a coordinate of a preset position on the obtained ROI image;

a fourth obtaining module 908, configured to determine whether the coordinate of the preset position that is obtained by the third obtaining module 907 has a coordinate attribute specified by the image scaling module 902, so as to obtain a second determination result; and a second determining module 909, configured to determine, based on the second determination result obtained by the fourth obtaining module 908, whether the obtained ROI image satisfies the specified image alignment condition.

Figure 11:
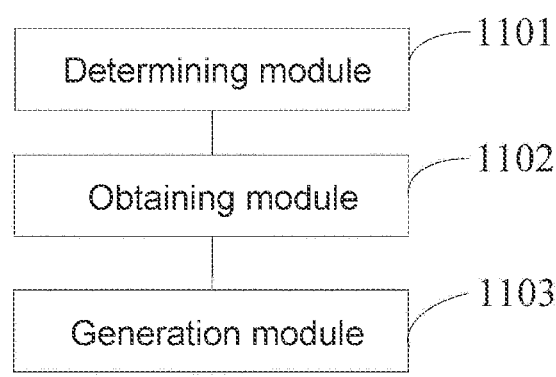
FIG. 11 is a schematic structural diagram of an apparatus for generating instructions for image processing according to an exemplary embodiment of the present disclosure.

FIG. 11 is a schematic structural diagram of an apparatus for generating instructions for image processing according to an exemplary embodiment of the present disclosure. The apparatus shown in FIG. 11 includes a determining module 1101, an obtaining module 1102, and a generation module 1103.

The determining module 1101 is configured to determine, when a hardware output size of an image scaling module does not match with a first image size supported by an image processing model, information about a splitting manner for a template image having the first image size based on the hardware output size and the first image size, where the information about the splitting manner is used for splitting the template image into a plurality of image blocks, and an image size of each of the plurality of image blocks matches with the hardware output size.

The obtaining module 1102 is configured to obtain first split data based on the information about the splitting manner determined by the determining module 1101.

The generation module 1103 is configured to generate instructions for image processing based on the first split data obtained by the obtaining module 1102, where the instructions for image processing are used for implementing the foregoing image processing method.

Figure 12:
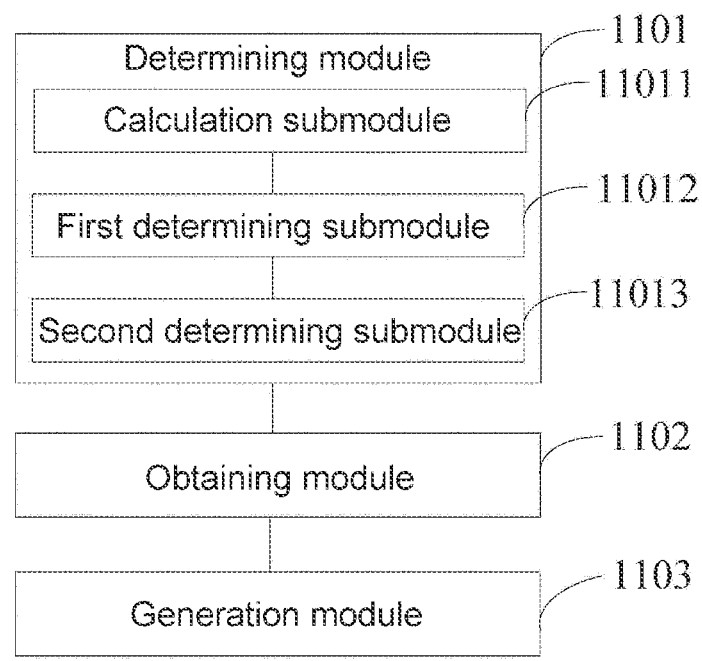
FIG. 12 is a schematic structural diagram of an apparatus for generating instructions for image processing according to another exemplary embodiment of the present disclosure.

In an optional example, as shown in FIG. 12, the determining module 1101 includes:

a calculation submodule 11011, configured to calculate a first product when a divisor of a value of a size in a preset direction is specified by the image scaling module, where the first product is a product of the divisor and the value of the size in the preset direction in the first image size;

a first determining submodule 11012, configured to determine splitting positions on a template image having the first image size based on the first product calculated by the calculation submodule 11011; and a second determining submodule 11013, configured to determine the information about the splitting manner for the template image having the first image size based on the splitting positions determined by the first determining submodule 11012.

In an optional example, the first determining submodule 11012 includes:

a fifth determining unit, configured to determine a first target value and a second target value based on the first product, where a product of the first target value and the second target value satisfies a preset relationship with the first product; and a sixth determining unit, configured to determine the splitting positions on the template image having the first image size based on the second target value determined by the fifth determining unit, where in the preset direction of the template image, size value for each of the size segments obtained through dividing by using the determined splitting positions is an integer multiple of the second target value.

The apparatus further includes:

a recording module, configured to record the first target value determined by the fifth determining unit.

In an optional example, the fifth determining unit includes:

a first determining subunit, configured to determine at least one reference parameter group based on the first product, where each of the at least one reference parameter group includes two values, and a product of the two values in any reference parameter group satisfies a preset relationship with the first product;

a selection subunit, configured to select a first reference parameter group from the at least one reference parameter group; and a second determining subunit, configured to take a value in the first reference parameter group selected by the selection subunit as the first target value, and take the other value in the first reference parameter group selected by the selection subunit as the second target value.

In an optional example, the selection subunit is specifically configured to calculate a total alignment-cost value for each of the at least one reference parameter group respectively; and select a reference parameter group corresponding to a smallest total alignment-cost value as the first reference parameter group.

In an optional example, the selection subunit is specifically configured to determine splitting positions in the preset direction of the template image based on a larger one of the two values included in any one of the at least one reference parameter group, and calculate an alignment-cost value for each splitting position; and calculate a sum of the obtained alignment-cost values, to obtain the total alignment-cost value for the one reference parameter group.

In an optional example, the selection subunit is specifically configured to obtain a coordinate in the preset direction in coordinates of a splitting position; calculate a result of a remainder operation ter the obtained coordinate and the larger one of the two values included in any reference parameter group; calculate a ratio of the first product and the larger one of the two values included in the reference parameter group; calculate a difference between the ratio and a preset value; and calculate a weighted sum of the result of the remainder operation and the difference based on a preset adjustment factor, to obtain the alignment-cost value for the splitting position.

Exemplary Electronic Device

An electronic device according to an embodiment of the present disclosure is described below with reference to FIG. 13. The electronic device may be any one or two of a first device and a second device, or a stand-alone device separated from the first device and the second device. The stand-alone device may communicate with the first device and the second device, to receive a collected input signal therefrom.

Figure 13:
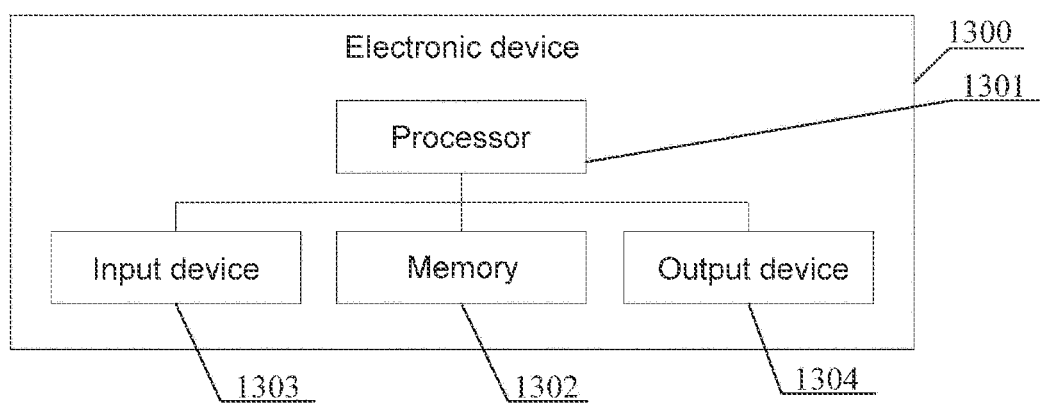
FIG. 13 is a structural diagram of an electronic device according to an exemplary embodiment of the present disclosure.

FIG. 13 is a block diagram of an electronic device according to an embodiment of the present disclosure.

As shown in FIG. 13, an electronic device 1300 includes one or more processors 1301 and a memory 1302.

The processor 1301 may be a central processing unit (CPU) or another form of processing unit having data processing capability and/or instruction execution capability, and may control another component in the electronic device 1300 to perform a desired function.

The memory 1302 may include one or more computer program products. The computer program product may include various forms of computer-readable storage media, such as a volatile memory and/or a non-volatile memory. The volatile memory may include, for example, a random access memory (RAM) and/or a cache. The nonvolatile memory may include, for example, a read-only memory (ROM), a hard disk, and a flash memory. One or more computer program instructions may be stored in the computer readable storage medium. The processor 1301 may execute the program instructions, to implement the image processing method or the method for generating instructions for image processing according to the embodiments of the present disclosure that are described above. Various contents such as an input signal, a signal component, and a noise component may also be stored in the computer readable storage medium.

In an example, the electronic device 1300 may further include an input device 1303 and an output device 1304. These components are connected with each other via a bus system and/or another form of connection mechanism (not shown).

For example, when the electronic device 1300 is a first device or a second device, the input device 1303 may be a microphone or a microphone array. When the electronic device 1300 is a stand-alone device, the input device 1303 may be a communication network connector, and is configured to receive the obtained input signals from the first device and the second device.

In addition, the input device 1303 may further include, for example, a keyboard and a mouse. The output device 1304 may output various information to the outside, including the determined distance information, direction information, and the like. The output device 1304 may include, for example, a display, a loudspeaker, a printer, a communication network, and a remote output device connected by the communication network.

For simplicity, FIG. 13 shows only some of components in the electronic device 1300 that are related to the present disclosure, and components such as a bus and an input/output interface are omitted. In addition, according to specific application situations, the electronic device 1300 may further include any other appropriate components.

Exemplary Computer Program Product and Computer Readable Storage Medium

In addition to the foregoing method and device, the embodiments of the present disclosure may further relate to a computer program product, which includes computer program instructions. When executing the computer program instructions, the processor is enabled to perform the steps, of the image processing method or the method for generating instructions for image processing according to the embodiments of the present disclosure, that are described in the "exemplary method" part of this specification.

The computer program product may be program code, written with a programming language or any combination of a plurality of programming languages, and configured to perform the operations in the embodiments of the present disclosure. The programming languages include an object-oriented programming language such as Java or C++, and further include a conventional procedural programming language such as a "C" language or a similar programming language. The program code may be entirely or partially executed on a user computing device, executed as an independent software package, partially executed on the user computing device and partially executed on a remote computing device, or entirely executed on the remote computing device or a server.

In addition, the embodiments of the present disclosure may further relate to a computer readable storage medium, which stores computer program instructions. When the computer program instructions are executed, the processor is enabled to perform the steps, of the image processing method or the method for generating instructions for image processing according to the embodiments of the present disclosure, that are described in the "exemplary, method" part of this specification.

The computer-readable storage medium may be a readable medium or any combination of a plurality of readable media. The readable medium may be a readable signal medium or a readable storage medium. The readable storage medium may include, for example, but is not limited to electricity, magnetism, light, electromagnetism, infrared ray, or a semiconductor system, apparatus or device, or any combination thereof. More specific examples (a non-exhaustive list) of the readable storage medium include: an electrical connection with one or more conducting wires, a portable disk, a hard disk, a random access memory (RAM), a read-only memory (ROM), an erasable programmable read-only memory (EPROM or flash memory) or a flash memory, an optical fiber, a portable compact disk read-only memory (CD-ROM), an optical storage device, a magnetic storage device, or any suitable combination thereof.

Fundamental principles of the present disclosure are described above in combination with the specific embodiments. However, it should be pointed out that the advantages, superiorities, and effects mentioned in the present disclosure are merely examples but are not for limitation, and it cannot be considered that these advantages, superiorities, and effects are necessary for each embodiment of the present disclosure. In addition, specific details of the above disclosure are merely for illustration and for ease of understanding, rather than limitations. The foregoing details do not limit that the present disclosure must be implemented by using the foregoing specific details.

The various embodiments in this specification are all described in a progressive way, and each embodiment focuses on a difference from other embodiments. For same or similar parts among the various embodiments, reference may be made to each other. The apparatus embodiments basically correspond to the method embodiments, and thus are relatively simply described. For the related components, reference may be made to the corresponding part of the descriptions of the method embodiments.

The block diagrams of the equipment, the apparatus, the device, and the system involved in the present disclosure are merely exemplary examples and are not intended to require or imply that the equipment, the apparatus, the device, and the system must be connected, arranged, and configured in the manners shown in the block diagrams. It is recognized by a person skilled in the art that, the equipment, the apparatus, the device, and the system may be connected, arranged, and configured in an arbitrary manner. The terms such as "include", "contain", and "have" are inclusive terms that mean "including but not limited to", and may be used interchangeably with "including but not limited to". The terms "or" and "and" used herein refer to the term "and/or", and may be used interchangeably with "and/or", unless the context clearly indicates otherwise. The term "such as" used herein refers to the phrase "such as but not limited to"; and may be used interchangeably with "such as but not limited to".

The method and the apparatus in the present disclosure may be implemented in many ways. For example, the method and the apparatus in the present disclosure may be implemented by software, hardware, firmware, or any combination of the software, the hardware, and the firmware. The foregoing sequence of the steps of the method is for illustration only, and the steps of the method in the present disclosure are not limited to the sequence specifically described above, unless otherwise specifically stated in any other manner. In addition, in some embodiments, the present disclosure may also be implemented as programs recorded in a recording medium. These programs include machine-readable instructions for implementing the method according to the present disclosure. Therefore, the present disclosure further relates to a recording medium storing a program for implementing the method according to the present disclosure.

It should be further pointed out that, various components in the apparatus, the device, or various steps in the method of the present disclosure may be disassembled and/or recombined. These disassembled and/or recombined components or steps shall be regarded as equivalent solutions of the present disclosure.

The foregoing description about the disclosed aspects is provided, so that the present disclosure can be arrived at or carried out by any person skilled in the art. Various modifications to these aspects are quite obvious to a person skilled in the art. Moreover, general principles defined herein may be applicable to other aspects without departing from the scope of the present disclosure. Therefore, the present disclosure is not intended to be limited to the aspects illustrated herein, but to the widest scope consistent with the principles and novel features disclosed herein.

The foregoing description has been given for illustration and description. In addition, this description is not intended to limit the embodiments of the present disclosure to forms disclosed herein. Although a plurality of exemplary aspects and embodiments have been discussed above, a person skilled in the art may recognize certain variations, modifications, changes, additions, and sub-combinations thereof.

What is claimed is:

1. An image processing method, including:
    when a region of interest (ROI) image is obtained, determining and splitting a to-be-split ROI image to obtain a plurality of image blocks based on a first image size supported by an image processing model, first split data, and the obtained ROI image, wherein the first split data includes coordinate information of each splitting position in the height direction; and/or a proportional relationship between size segments split in the height direction; wherein each of a plurality of image sizes obtained by splitting the first image size based on the first split data is smaller than a hardware output size of an image scaling circuit; when the ROI image satisfies a specified image alignment condition, the to-be-split ROI image is the ROI image; and when the ROI image does not satisfy the specified image alignment condition, the to-be-split ROI is the obtained ROI image that satisfies the specified image alignment condition after image adjustment is performed on the ROI image;
    performing, by the image scaling circuit, image scaling on each of the plurality of image blocks respectively, to obtain a plurality of scaled image blocks, wherein a plurality of image sizes of the plurality of scaled image blocks are consistent in one-to-one correspondence with the plurality of image sizes obtained by splitting the first image size based on the first split data; and
    inputting the plurality of scaled image blocks to the image processing model, sequentially.

2. The method according to claim 1, wherein the determining and splitting a to-be-split ROI image to obtain a plurality of image blocks based on a first image size supported by an image processing model, first split data, and the obtained ROI image includes:
    determining second split data based on the first image size, the first split data, and a second image size of the to-be-split ROI image; and
    splitting the to-be-split ROI image based on the second split data, to obtain the plurality of image blocks.

3. The method according to claim 2, wherein the determining second split data based on the first image size, the first split data, and a second image size of the to-be-split ROI image includes:
    determining, based on the first split data, splitting positions, in a preset direction, of a template image having the first image size;
    determining a proportional relationship between a size in the preset direction in the second image size of the to-be-split ROI image and a size in the preset direction in the first image size;
    determining splitting positions, in the preset direction, of the to-be-split ROI image based on the proportional relationship and the splitting positions in the preset direction of the template image; and
    determining the second split data based on the splitting positions, in the preset direction of, the to-be-split ROI image.

4. The method according to claim 2, further including:
    obtaining a first target value, wherein the first target value is determined based on a divisor, specified by the image scaling circuit, of a value of a size in a preset direction, and a value of size in the preset direction in the first image size;

determining whether a value of size of the obtained ROI image in the preset direction is an integer multiple of the first target value, to obtain a first determination result; and determining, based on the first determination result, whether the obtained ROI image satisfies the specified image alignment condition.

5. The method according to claim 2, further including:

obtaining a coordinate of a preset position on the obtained ROI image;

determining whether the coordinate of the preset position has a coordinate attribute specified by the image scaling circuit, to obtain a second determination result; and determining, based on the second determination result, whether the obtained ROI image satisfies the specified image alignment condition.

6. The method according to claim 1, further including:

when the hardware output size of the image scaling circuit does not match with the first image size supported by the image processing model, determining information about a splitting manner for a template image having the first image size based on the hardware output size and the first image size, wherein the information about the splitting manner is used for splitting the template image into the plurality of image blocks, and an image size of each of the plurality of image blocks matches with the hardware output size;

obtaining the first split data based on the information about the splitting manner.

7. The method according to claim 6, wherein the determining information about a splitting manner for a template image having the first image size based on the hardware output size and the first image size includes:

calculating a first product when a divisor of a value of a size in a preset direction is specified by the image scaling circuit, wherein the first product is a product of the divisor and the value of the size in the preset direction in the first image size;

determining, based on the first product, splitting positions on a template image having the first image size; and determining the information about the splitting manner for the template image having the first image size based on the determined splitting positions.

8. The method according to claim 7, wherein the determining, based on the first product, splitting positions on a template image having the first image size includes:

determining a first target value and a second target value based on the first product, wherein a product of the first target value and the second target value satisfies a preset relationship with the first product; and determining the splitting positions on the template image having the first image size based on the second target value, wherein in the preset direction, size value for each of the size segments of the template image obtained by dividing with the determined splitting positions is integer multiple of the second target value; and wherein the method further includes:

recording the first target value.

9. The method according to claim 8, wherein the preset relationship of the product of the first target value and the second target value with the first product is the product is equal to the first product.

10. The method according to claim 8, wherein the determining a first target value and a second target value based on the first product includes:

determining at least one reference parameter group based on the first product, wherein each of the at least one reference parameter group includes two values, and a product of the two values in any reference parameter group satisfies a preset relationship with the first product;

selecting a first reference parameter group from the at least one reference parameter group; and taking a value in the first reference parameter group as the first target value, and taking the other value in the first reference parameter group as the second target value.

11. The method according to claim 10, wherein the selecting a first reference parameter group from the at least one reference parameter group includes:

calculating a total alignment-cost value for each of the at least one reference parameter group, respectively; and selecting a reference parameter group corresponding to a smallest total alignment-cost value as the first reference parameter group.

12. The method according to claim 11, wherein the calculating a total alignment-cost value for each of the at least one reference parameter group respectively includes:

determining splitting positions in the preset direction of the template image based on a larger one of the two values included in any one of the at least one reference parameter group, and calculating an alignment-cost value for each of the splitting positions; and calculating a sum of the obtained alignment-cost values, to obtain the total alignment-cost value of the reference parameter group.

13. The method according to claim 12, wherein the calculating the alignment-cost value for each of the splitting positions includes:

obtaining a coordinate in the preset direction in the coordinates of any one of the splitting positions;

calculating a result of a remainder operation for the obtained coordinate and the larger one of the two values included in any reference parameter group;

calculating a ratio of the first product and the larger one of the two values included in the reference parameter group;

calculating a difference between the ratio and a preset value; and calculating a weighted sum of the result of the remainder operation and the difference based on a preset adjustment factor, to obtain the alignment-cost value for the one splitting position.

14. The method according to claim 7, wherein the information about the splitting manner may include coordinate information of each splitting position in a width direction and coordinate information of each splitting position in a height direction, and/or the information about the splitting manner may include a proportional relationship between size segments split in the width direction and a proportional relationship between size segments split in the height direction.

15. A non-transitory computer readable storage medium, wherein the storage medium stores a computer program, the computer program being used for implementing an image processing method including:

when a region of interest (ROI) image is obtained, determining and splitting a to-be-split ROI image to obtain a plurality of image blocks based on a first image size supported by an image processing model, first split data, and the obtained ROI image, wherein the first split data includes coordinate information of each splitting position in the height direction; and/or a proportional relationship between size segments split in the height direction; wherein each of a plurality of image sizes obtained by splitting the first image size based on the first split data is smaller than a hardware output size of an image scaling circuit; when the ROI image satisfies a specified image alignment condition, the to-be-split ROI image is the ROI image; and when the ROI image does not satisfy the specified image alignment condition, the to-be-split ROI is the obtained ROI image that satisfies the specified image alignment condition after image adjustment is performed on the ROI image;

performing, by the image scaling circuit, image scaling on each of the plurality of image blocks respectively, to obtain a plurality of scaled image blocks, wherein a plurality of image sizes of the plurality of scaled image blocks are consistent in one-to-one correspondence with the plurality of image sizes obtained by splitting the first image size based on the first split data; and inputting the plurality of scaled image blocks to the image processing model, sequentially.

16. The non-transitory computer readable storage medium according to claim 15, wherein the determining and splitting a to-be-split ROI image to obtain a plurality of image blocks based on a first image size supported by an image processing model, first split data, and the obtained ROI image includes:

determining second split data based on the first image size, the first split data, and a second image size of the to-be-split ROI image; and splitting the to-be-split ROI image based on the second split data, to obtain the plurality of image blocks.

17. The non-transitory computer readable storage medium according to claim 16, wherein the determining second split data based on the first image size, the first split data, and a second image size of the to-be-split ROI image includes:

determining, based on the first split data, splitting positions, in a preset direction, of a template image having the first image size;

determining a proportional relationship between a size in the preset direction in the second image size of the to-be-split ROI image and a size in the preset direction in the first image size;

determining splitting positions, in the preset direction, of the to-be-split ROI image based on the proportional relationship and the splitting positions in the preset direction of the template image; and determining the second split data based on the splitting positions, in the preset direction of, the to-be-split ROI image.

18. An electronic device, wherein the electronic device includes:

a processor; and a memory, configured to store processor-executable instructions, wherein the processor is configured to read the processor-executable instructions from the memory and execute the instructions to implement an image processing method including:

when a region of interest (ROI) image is obtained, determining and splitting a to-be-split ROI image to obtain a plurality of image blocks based on a first image size supported by an image processing model, first split data, and the obtained ROI image, wherein the first split data includes coordinate information of each splitting position in the height direction; and/or a proportional relationship between size segments split in the height direction; wherein each of a plurality of image sizes obtained by splitting the first image size based on the first split data is smaller than a hardware output size of an image scaling circuit; when the ROI image satisfies a specified image alignment condition, the to-be-split ROI image is the ROI image; and when the ROI image does not satisfy the specified image alignment condition, the to-be-split ROI is the obtained ROI image that satisfies the specified image alignment condition after image adjustment is performed on the ROI image;

performing, by the image scaling circuit, image scaling on each of the plurality of image blocks respectively, to obtain a plurality of scaled image blocks, wherein a plurality of image sizes of the plurality of scaled image blocks are consistent in one-to-one correspondence with the plurality of image sizes obtained by splitting the first image size based on the first split data; and inputting the plurality of scaled image blocks to the image processing model, sequentially.

19. The electronic device according to claim 18, wherein the determining and splitting a to-be-split ROI image to obtain a plurality of image blocks based on a first image size supported by an image processing model, first split data, and the obtained ROI image includes:

determining second split data based on the first image size, the first split data, and a second image size of the to-be-split ROI image; and splitting the to-be-split ROI image based on the second split data, to obtain the plurality of image blocks.

20. The electronic device according to claim 19, wherein the determining second split data based on the first image size, the first split data, and a second image size of the to-be-split ROI image includes:

determining, based on the first split data, splitting positions, in a preset direction, of a template image having the first image size;

determining a proportional relationship between a size in the preset direction in the second image size of the to-be-split ROI image and a size in the preset direction in the first image size;

determining splitting positions, in the preset direction, of the to-be-split ROI image based on the proportional relationship and the splitting positions in the preset direction of the template image; and determining the second split data based on the splitting positions, in the preset direction of, the to-be-split ROI image.

* * * * *